United States Patent
Osher et al.

(10) Patent No.: US 9,980,466 B1
(45) Date of Patent: May 29, 2018

(54) WIRELESS LIGHTED ANIMAL RESTRAINT FOR ILLUMINATING AN ENTIRE LENGTH OF THE RESTRAINT

(71) Applicant: Nitey Leash, LLC, Mayfield Heights, OH (US)

(72) Inventors: John D. Osher, Ft. Lauderdale, FL (US); Joseph Hassan, Forest Hills, NY (US)

(73) Assignee: Nitey Leash, LLC, Mayfield Heights, OH (US)

( * ) Notice: Subject to any disclaimer, the term of this patent is extended or adjusted under 35 U.S.C. 154(b) by 0 days. days.

(21) Appl. No.: 15/424,984

(22) Filed: Feb. 6, 2017

Related U.S. Application Data

(60) Provisional application No. 62/417,566, filed on Nov. 4, 2016.

(51) Int. Cl.
| | |
|---|---|
| *A01K 27/00* | (2006.01) |
| *F21L 4/00* | (2006.01) |
| *F21V 23/04* | (2006.01) |
| *F21V 8/00* | (2006.01) |
| *F21V 15/01* | (2006.01) |
| *F21Y 115/10* | (2016.01) |
| *F21Y 113/13* | (2016.01) |

(52) U.S. Cl.
CPC .......... *A01K 27/006* (2013.01); *A01K 27/003* (2013.01); *F21L 4/00* (2013.01); *F21V 15/01* (2013.01); *F21V 23/0414* (2013.01); *F21V 23/0435* (2013.01); *G02B 6/001* (2013.01); *G02B 6/0008* (2013.01); *F21Y 2113/13* (2016.08); *F21Y 2115/10* (2016.08)

(58) Field of Classification Search
CPC ... A01K 27/006; A01K 27/009; A01K 27/003
See application file for complete search history.

(56) References Cited

U.S. PATENT DOCUMENTS

| | | |
|---|---|---|
| 504,055 A | 8/1893 | Shaw |
| 634,014 A | 10/1899 | Molloy |
| 1,379,093 A | 5/1921 | Freeberg |
| 1,879,991 A | 9/1932 | Pratt |
| 4,270,491 A | 6/1981 | Cox |
| 4,488,511 A | 12/1984 | Grassano |
| 4,513,692 A | 4/1985 | Kuhnsman et al. |
| 4,887,552 A | 12/1989 | Hayden |

(Continued)

FOREIGN PATENT DOCUMENTS

JP 2013-240283 A 12/2013

OTHER PUBLICATIONS

PCT/US 17/16647, International Search Report and Written Opinion, dated Apr. 13, 2017, ISA/US, 10 pages.

(Continued)

*Primary Examiner* — Trinh T Nguyen
(74) *Attorney, Agent, or Firm* — Fay Sharpe LLP; James E. Scarbrough

(57) ABSTRACT

An illuminated animal restraint includes an elongated leash which has a housing having a selectively enabled wireless lighting assembly. The wireless lighting assembly has a light source connected via a wireless connection to a light transmitting member extending through said tube thereby illuminating the entire length and all sides of the leash. The wireless light assembly may include at least one Light Emitting Diode assembly and a light transmitting member may include fiber optics.

16 Claims, 5 Drawing Sheets

(56) References Cited

U.S. PATENT DOCUMENTS

| | | |
|---|---|---|
| 5,005,527 A | 4/1991 | Hatfield |
| 5,558,044 A | 9/1996 | Nasser, Jr. et al. |
| 5,850,807 A | 12/1998 | Keeler |
| 5,930,382 A | 7/1999 | Irie et al. |
| 5,967,095 A | 10/1999 | Greves |
| 6,330,949 B1 | 12/2001 | DeRisio |
| 6,557,498 B1 | 5/2003 | Smierciak et al. |
| 6,727,826 B1 | 4/2004 | Ki Kwan et al. |
| 6,840,655 B2 | 1/2005 | Shen |
| 6,846,094 B2 | 1/2005 | Luk |
| 6,857,924 B2 | 2/2005 | Fu et al. |
| 6,877,889 B2 | 4/2005 | Peng et al. |
| 7,410,197 B2 | 8/2008 | Edwards |
| 7,530,334 B1 | 5/2009 | Napolitano |
| 7,536,980 B2 | 5/2009 | Cooper |
| 7,690,331 B2 | 4/2010 | Hurwitz |
| 7,954,482 B2 | 6/2011 | Castonguay et al. |
| 9,545,084 B2 | 1/2017 | Osher et al. |
| 2006/0221599 A1 | 10/2006 | Hornsby et al. |
| 2006/0239624 A1 | 10/2006 | Hsu et al. |
| 2007/0039561 A1 | 2/2007 | Tarlton |
| 2008/0091097 A1 | 4/2008 | Linti et al. |
| 2011/0000440 A1 | 1/2011 | Mucerino, Jr. et al. |
| 2013/0333632 A1 | 12/2013 | Osher et al. |

OTHER PUBLICATIONS

Shine for Dogs "Key Features LED Collars and Leashes" shinefordogs.com, published on Oct. 3, 2016, retrieved on Apr. 6, 2017, accessed at <https://web-beta.archive.org/web/20161003191630//http://www.shinefordogs.com/key-features-led-collars-and-leashes>, entire document.

Squeaker "Poochlight Illuminating Dog Leads" www.squeakerdogs.com, published on Apr. 17, 2016, retrieved on Apr. 6, 2017, accessed at <https://web-beta.archive.org/web/20160417080550/https://www.squeakerdogs.com/collections/poochlight-illuminating-dog-leads>, entire document.

Lumi Pet "Lumi Fiber Optic Leashes" www.lumipet.net, published on Oct. 10, 2014, retrieved on Apr. 6, 2017, accessed at ttps://web-beta.archive.org/web/20141010223313/http://www.lumipet.net:80/products/Iumi-leashes/, entire document.

Web page for Jinhua Solid Tools Co., Ltd., 2 pages, dated Aug. 6, 2012.

Web page for Alibaba.com, 3 pages, dated Aug. 6, 2012.

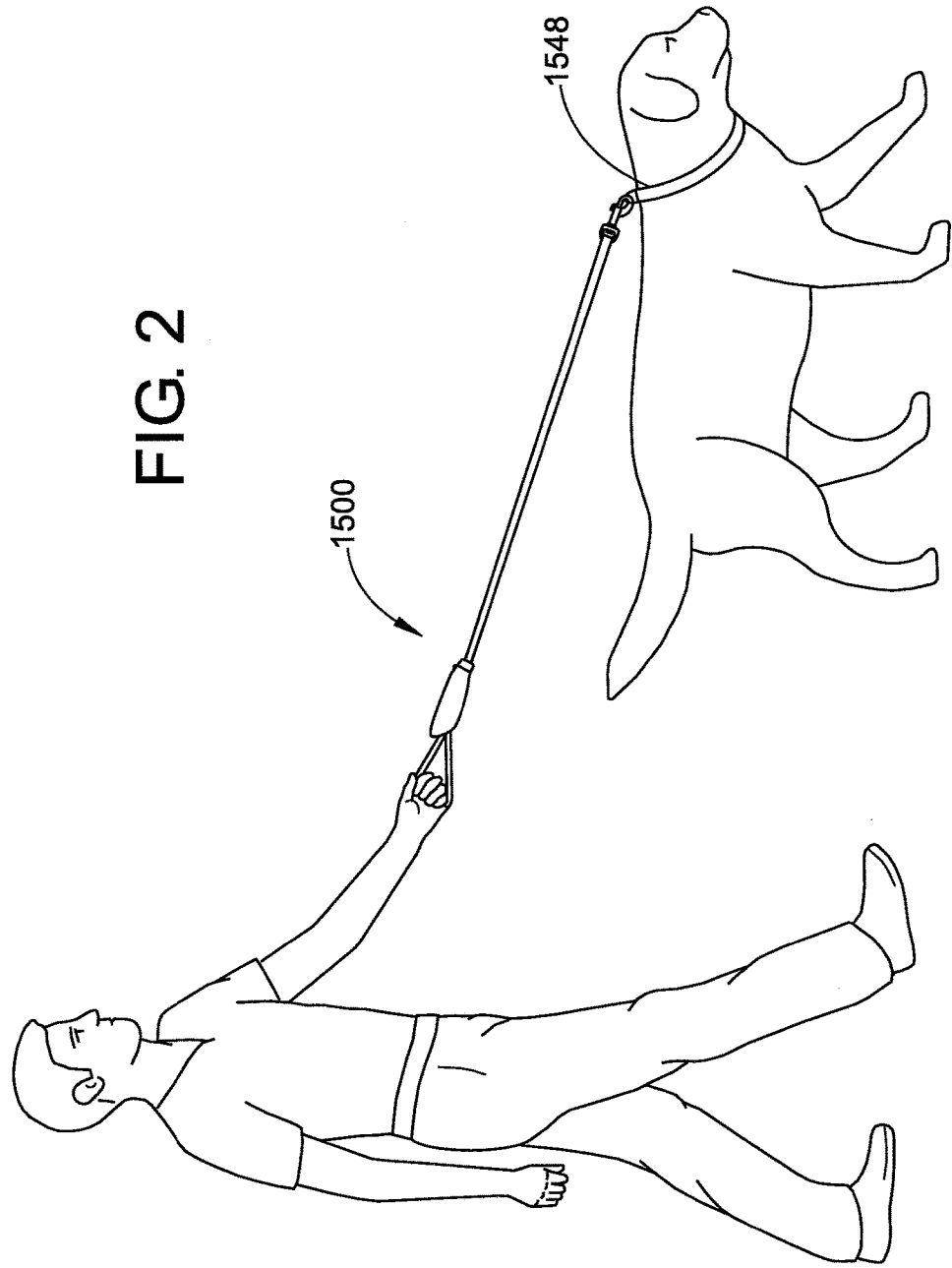

WIRELESS LIGHTED ANIMAL RESTRAINT FOR ILLUMINATING AN ENTIRE LENGTH OF THE RESTRAINT

CLAIM OF PRIORITY

This application claims priority from Provisional Patent Application Ser. No. 62/417,566 filed on Nov. 4, 2016, the entirety of which is hereby incorporated by reference.

BACKGROUND OF THE DISCLOSURE

The present disclosure relates to animal or pet restraints. More particularly, it relates to a leash which is illuminated by light sources such as, but not limited to, fiber optics, LEDs or any other suitable light sources especially used for walking a pet or animal during dusk or nighttime hours to increase visibility as well as safety for both the pet and pet owner or walker in dark or dimly lit situations and environments.

Walking a pet at night or at dusk can pose visibility and safety issues for pets and their owners. Being visible to automobiles, bikes, etc. can prevent injury or harm to either the pet or the pet owner or walker. Thus, there is a need for leashes and collars which are illuminated. Furthermore, lighted pet leashes add a dimension of style and fun to walking a pet.

However, a problem with some existing collars and leashes is they are often reflectively illuminated and rely on external light to trigger the reflective illumination.

Other existing leashes provide a light source that does not effectively light the entire length of the leash, thus not providing an optimum amount of illumination to the leash. Rather, these leashes only illuminate a portion of the leash, i.e., about one or two feet of the length of the leash. A problem with these leashes is they do not provide an adequate amount of lighting to the leash and do not effectively increase the safety and visibility of the pet and user.

Other leashes only illuminate a portion of or one side of the leash, e.g., the front of the leash but not the rear of the leash facing the user.

Other leashes only illuminate the leash in only one color and do not allow for multi-colored lights or sequencing of lights such as intermitted flashing, etc.

Still other existing leashes use wires to illuminate the leash which can stretch or bend and eventually break when the leash is pulled on by the user or animal, thus rendering the leash lighting defective.

Accordingly, there is a need for an illuminated animal leash which provides illumination that extends along the entire length of the leash and illuminates the entire leash front and back without using any wiring in the lighting feature and which overcomes the above-mentioned deficiencies and others while providing better overall results.

SUMMARY OF THE DISCLOSURE

The present disclosure relates to animal or pet restraints. More particularly, it relates to a pet or animal leash which is illuminated by a wireless lighting assembly using light sources such as, but not limited to, Light Emitting Diodes (LEDs) and light transmitting members such as, but not limited to, fiber optics especially used for walking a pet or animal at dusk or at night.

One embodiment of the disclosure is an animal restraint or leash which has a lighting feature which effectively illuminates the entire length of the leash.

Another embodiment for the animal restraint is a wireless lighting feature which eliminates wires bending and breaking which would render the leash defective.

Another embodiment of the disclosure is an animal restraint which illuminates the entire leash including a front and rear portion of the leash.

In accordance with a preferred embodiment of the disclosure, an illuminated animal restraint includes an elongated leash having a housing having a selectively enabled light source. The selectively enabled light source is connected to a light transmitting member extending through the tube without using any wiring and illuminates the leash. The light source preferably has at least one Light Emitting Diode assembly, and the light transmitting member preferably includes fiber optics.

In accordance with another embodiment of the disclosure, an illuminated animal restraint has an elongated leash having a first end including a handle and a second end having a hook. The handle includes a light source preferably including a Light Emitting Diode and a switch for selectively operating the light source. The leash includes a light transmitting member preferably having a fiber optic operatively connected to the light source without using any wiring. The light transmitting member extends through the leash along the entire length of the leash thereby illuminating the entire length of the leash.

Still another embodiment of the disclosure is a gripping handle which is ergonomically shaped of flexible or rigid material so the user can hold it and operate the lighting function with one hand.

Yet another embodiment of the disclosure is the handle can house AAA batteries as opposed to button cells to provide longer lasting power to the lighting system.

Still another embodiment of the disclosure is a loop or strap around the handle so the user can use the device as a normal pet leash.

Still another embodiment of the leash is illuminated with multi-colors and sequencing for intermittent lights or flashing.

Still other aspects of the disclosure will become apparent upon a reading and understanding of the following detailed description.

BRIEF DESCRIPTION OF THE DRAWINGS

FIG. 2 is a side elevational view showing a user and the animal restraint of FIG. 1 being used with a pet.

DETAILED DESCRIPTION OF THE DISCLOSURE

With reference to FIGS. 1-4, a preferred embodiment of a lighted animal or pet restraint in the form of a leash is shown and described. The Figures illustrate a preferred embodiment of the disclosure only and the disclosure is not limited to the embodiments of the Figures. The restraint may also include a collar in addition to a leash.

Figure 1:
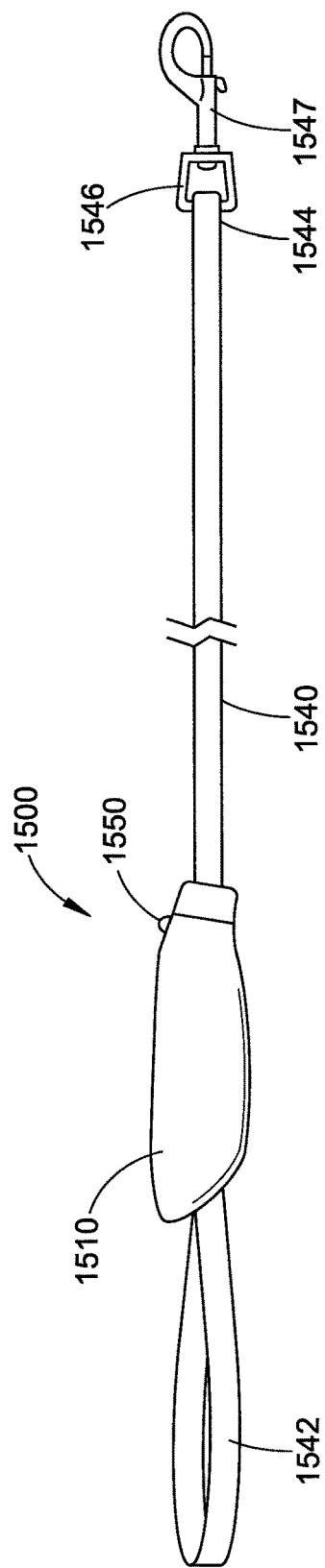
FIG. 1 is a side elevational view of the animal restraint in accordance with a preferred embodiment of the disclosure.

Referring now to FIGS. 1 and 2, the physical embodiments of the restraint preferably include a leash 1500 having a handle 1510, a handle strap 1542 connected to and extending from the handle and a lead or rope 1540 extending from the handle. At an opposite end 1544 of the rope is a loop 1545 (FIG. 4) for holding ring 1546 of a metal lock hook 1547 for attaching the leash to a collar 1548 (see FIG. 2).

The leash is preferably five feet long, but other lengths are contemplated by the disclosure. The length of the rope can be any desired length, such as, for example, three, four, five, six or more feet. The rope is also preferably water resistant for rainy day use. The rope can be made of any suitable material such as polypropylene (PP), nylon, vinyl, etc. and the lighting feature may also be interwoven into the rope along the length of the leash. The rope can be water resistant for rainy day use.

The handle strap 1542 can be made of the same or different material as the rope 1540. For instance, in some embodiments the handle strap can be leather or an imitation leather material such as vinyl. The handle strap and handle can cooperate to secure the leash in a hand of a user such as a pet walker.

With reference to FIG. 1, it can be seen that the handle embodiment has an ergonomically designed shape so that a user can easily hold it and operate the illuminating function with only one hand by depressing activating button 1550. The handle 1510 preferably can have a textured surface to prevent slipping off of the hand of a user.

Figure 4:
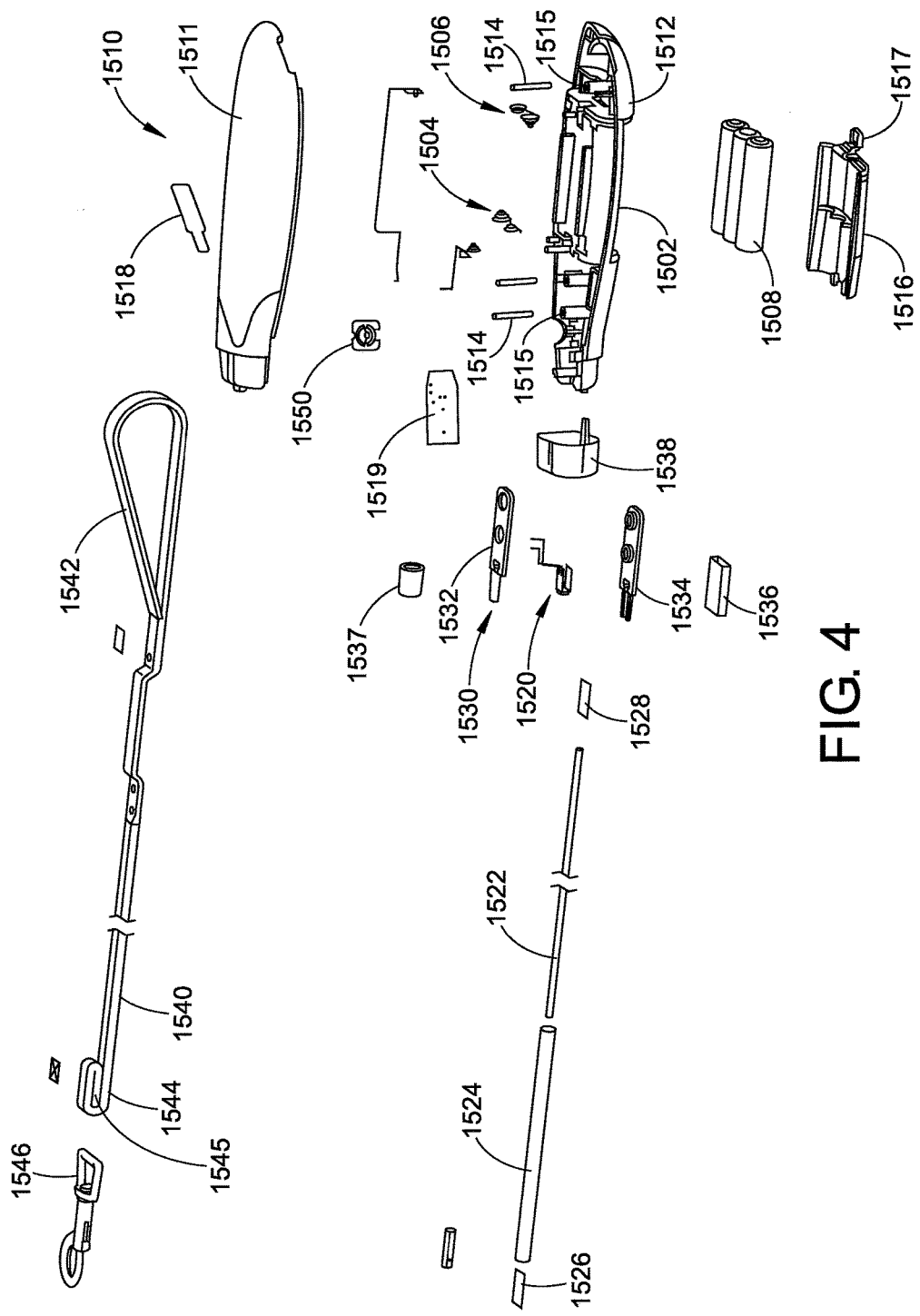
FIG. 4 is an exploded perspective view of the illuminated animal restraint of FIG. 1.

Referring to FIG. 4, the handle can be made of two rigid plastic halves 1511, 1512 secured together, or it can be made of flexible material. As an alternative, the handle itself can be a strap loop made of the same material as the leash itself, such as nylon or polypropylene rope. This will allow the handle to be softer, more pliable and more comfortable. Loop or strap 1542 around the handle 1510 additionally secures the handle to the hand of a user in the manner of a conventional animal leash. The loops help ensure a secure, comfortable grip.

From an electrical or electronic standpoint, the restraint includes provisions for a power source (e.g., a battery), a control switch, and a light source drive and a light transmitting member.

Figure 3A:
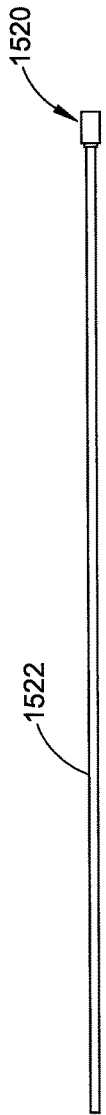
FIG. 3A is a side elevational view of a fiber optic tube and LED of the restraint of FIG. 1.
Figure 3B:
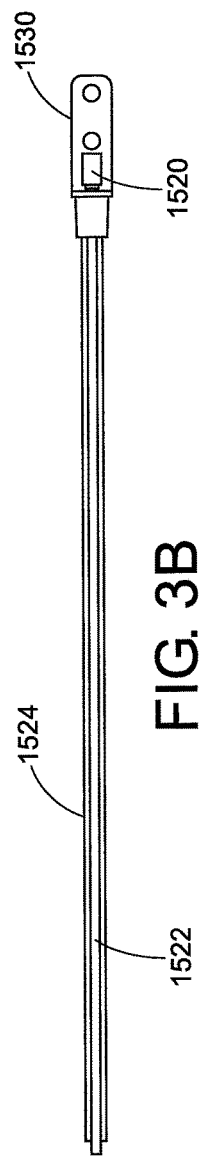
FIG. 3B is a side elevational view of a PVC tube and LED holding plate of the restraint of FIG. 1.
Figure 3C:
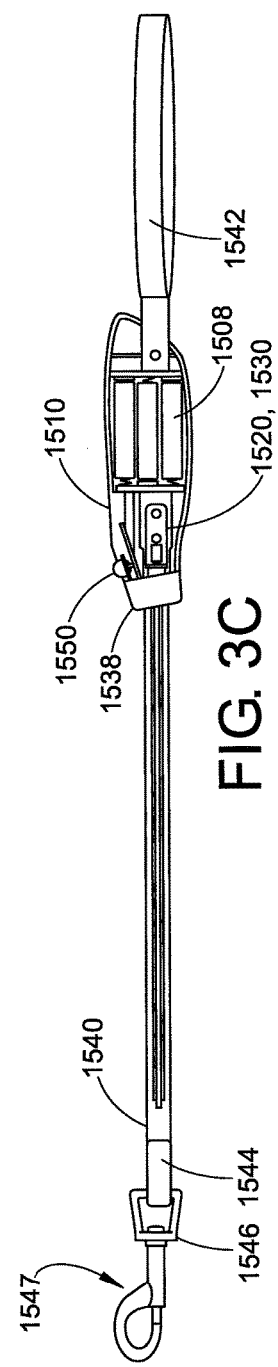
FIG. 3C is a side elevational view of a rope and handle bottom of the restraint of FIG. 1.
Figure 3D:
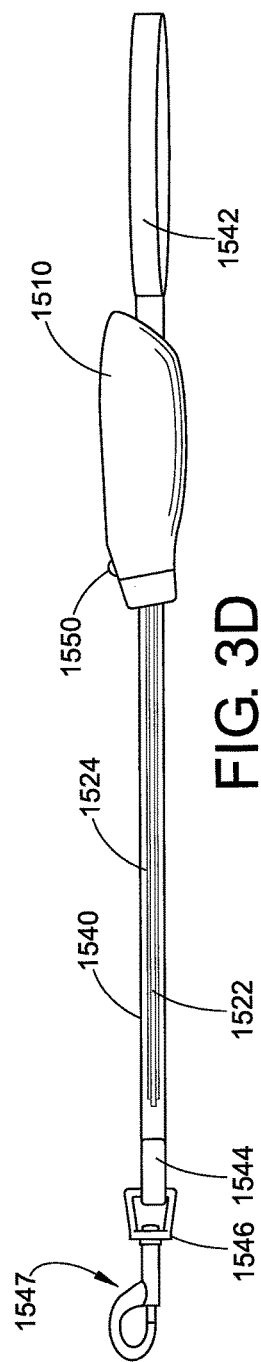
FIG. 3D is a side elevational view of a rope and handle top of the restraint of FIG. 1.

Referring now to FIGS. 3A-3B, the handle includes activating button or control switch 1550 and other electrical or electronic components. For example, a slot may be provided in the handle for receiving an insulator tab 1518 (FIG. 4) for separating contacts of an enabling sensor. As an alternative, a USB rechargeable interference could also be provided.

Provisions for a power source (batteries 1508), and a light source and light source drive can also be housed internally within the handle. A printed circuit board assembly (PCBA) 1519 controls operation of a light source such as, but not limited to, a Light Emitting Diode (LED) 1520.

Referring to FIG. 4, the power source provision can include a chamber 1502 and electrical contacts 1504, 1506 for receiving batteries such as three AAA batteries 1508. Other batteries such as C and/or D batteries could also be used in some embodiments. Other embodiments could allow for solar cell recharging of an energy storage device such as a battery or capacitor.

The batteries and battery chamber can be housed within a handle assembly 1510 including a top member 1511 and a bottom member 1512 both preferably formed of plastic. Several pins 1514 are positioned within openings to both align and secure the top and bottom portions 1510, 1512 of the handle together. A battery cover 1516 snaps over the handle bottom via restraint clip 1517 to secure the batteries in place.

A problem with existing illuminated leashes is the light source does not effectively light the entire length of the leash. Another problem with existing leashes is they do not illuminate all sides of the leash, rather just the front portion facing away from the user.

Still another problem with existing illuminated leashes is the lighting feature includes wiring which extends through the leash. When the leash has force exerted on it by either the user or the pet, the wiring can stretch or bend and eventually break, thus rendering the leash defective. The present disclosure overcomes each of these problems.

Thus, in accordance with a preferred embodiment of the disclosure, and referring to FIGS. 3A-3D and 4, the wireless light assembly of the present disclosure preferably includes a light source such as a light emitting diode (LED) assembly 1520 including a printed circuit board assembly such as, for example, white, blue, red, green, pink, yellow, amber, orange, or any other desired color, or infrared light emitting diode. Other suitable light sources are also contemplated by the disclosure. LEDs which use multiple color combinations could also be used. As another option, the LED circuit board can be programmed to illuminate the leash with multi-colored lights or LEDs. The lights can also be programmed to be sequential in intermittent flashing, etc. One application could be LED lights which represent the colors associated with professional sports teams such as from the NFL, NBA, MLB, as well as college teams. Other colors could be used based on famous musical acts, etc. Possibly logos or words could be illuminated on the leash itself.

Figure 4A:
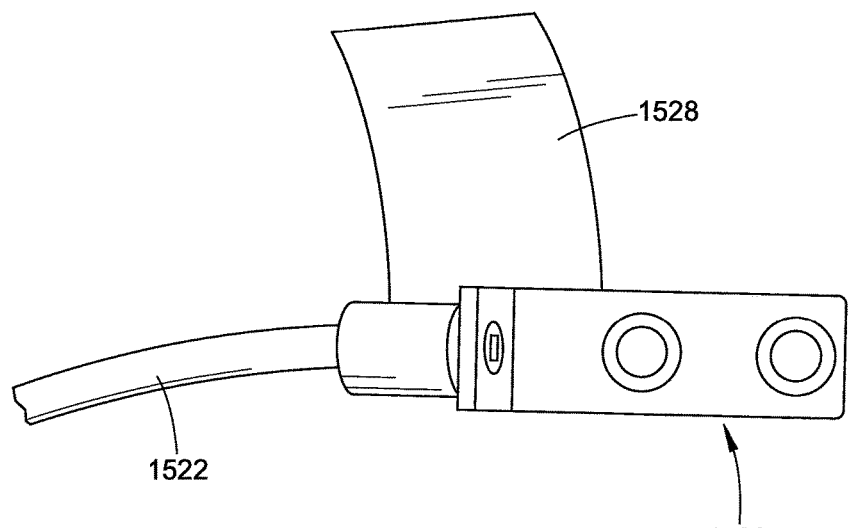
FIG. 4A is a perspective view of a light holding plate and a light transmitting member wireless connection.

The light from the light source is preferably distributed through a light transmitting member 1522. The light source is operationally connected to the light transmitting member without the use of any wires. For example, referring to FIG. 4A, the light source has a holding plate 1530 such as a plastic plate which holds the light (e.g. LED) adjacent or near the light transmitting member 1522 (e.g. Fiber optic tube). The assembly of the plate 1530 and member 1522 is wrapped together using tape 1528 connected to an end of transmitting member 1522. The light transmitting member can be, but is not limited to, fiber optic material, PU (polyurethane), or any light suitable conducting materials. The light transmitting material 1522, if it is fiber optics, is formed by a fiber optic chemical liquid converted into a solid through a heating and cooling process and which is held by Teflon cladding or any suitable plastic material such as polyvinyl chloride (PVC), etc. The light transmitting member 1522, in turn, extends through a clear PVC tube 1524 which extends along the entire length of the leash. The PVC tube 1524 also helps form the shape of the leash by surrounding the tube with the rope 1540. Alternatively, the fiber optic material 1522 is interwoven directly with the rope.

As a result, the leash is completely illuminated from end to end and is also illuminated on all sides, that is, in particular the front of the leash facing away from the user and the rear of the leash facing the user. The lighting also effectively illuminates the leash during the daytime. Tape or other sealing material 1526, 1528 may be located at opposite ends of the fiber optic assembly. Tape 1528 helps connect the fiber optic assembly to the LED holding plate. The purpose of the tape, which can be color coordinated with the color of the lighted leash, is to block excess light (i.e., a "hot spot") when the rope is stretched, yet still allows enough light to illuminate to the end of the leash when the leash becomes longer (i.e. as the rope stretches when a dog pulls).

The LED light source 1520 is secured onto an LED holding plate 1530 which has an upper portion 1532 and a lower portion 1534. A Polyethylene Teraphtholate (PET) film 1536 is positioned over or around the LED.

The LED or light assembly is positioned within the handle adjacent a bushing 1537 and an end cap 1538 on an outer end of the handle. The fiber optic and PVC tubes are positioned within the leash rope 1540 which extends through the handle and forms a loop or strap 1542 for extending over the hand and wrist of the user.

According to one aspect of the disclosure, the restraint is completely illuminated from end to end to facilitate safe evening walks with pets.

According to another aspect of the disclosure, the restraint is completely illuminated on all sides, in particular the front and rear portion of the leash.

According to another aspect of the disclosure, the animal restraint uses a lighting feature which has a light source operationally connected to a light transmitting member without using any wires to eliminate wire breakage which would render the leash defective.

According to another aspect of the disclosure, the animal restraint is lighted using a light source such as LEDs and a light transmitting member such as fiber optics.

According to another aspect of the disclosure, the animal restraint or leash is preferably about 5 feet long.

According to another aspect of the disclosure, the animal restraint can be effectively lit in the daytime.

According to another aspect of the disclosure, the restraint is water resistant for rainy day use.

According to another aspect of the disclosure, a loop is formed at the end of the handle to ensure secure, comfortable grip.

According to another aspect of the disclosure, a fiber optic thread can be weaved with a threaded material along the length of the leash to illuminate the entire length of the leash.

According to another aspect of the disclosure, an illuminated leash extension can be provided, which is used with existing, non-illuminated leashes and would be secured to the leash in a similar manner as a collar via a clip or the like.

The leash extension could be about one foot long and could be made from nylon and have a light source such as an LED housed within to light up the extension. A D-ring or other fastener could be provided at one end of the leash extension to attach it to a regular leash and a clasp on the fastener can be provided at the other end to attach the extension to a collar.

Other embodiments of the disclosure may include: a) illumination of the handle itself; b) lettering or wording on the handle may be illuminated (such as Nitey Leash™) so users can clearly see the name of the leash; or c) the additional of a flashlight/poop light; and d) use of multi-color lights or sequencing of lights, including colors used by professional or college sports teams, musical acts, etc.

The embodiments described above are illustrative only. Various other embodiments are encompassed or contemplated by the disclosure and the appended claims. For example, other illumination can be added to the system such as on the handle.

What is claimed is:

1. An illuminated animal restraint leash comprising:
an elongated flexible lead assembly including an elongated flexible tubular lead and an elongated fiber optic member including a light receiving input end, the elongated fiber optic member extending substantially within an interior of the elongated flexible tubular lead, the elongated flexible tubular lead made of a material transparent or translucent to light, at least in part, and the elongated fiber optic member including an elongated continuous peripheral external surface which radiates light received at the light receiving input and substantially radiates the light from an entire continuous length of the elongated continuous peripheral external surface through the elongated flexible tubular lead to provide an externally completely illuminated leash; an elongated inner tube extending within the interior of the elongated flexible tubular lead, the elongated fiber optic member extending within an interior of the inner elongated tube and the inner elongated tube formed of transparent or translucent material; and
a housing operatively attached to the elongated flexible lead assembly, the housing including a user selectably enabled light assembly including a LED (Light Emitting Diode) wirelessly and optically coupled to the elongated fiber optic member light receiving end.

2. The illuminated animal restraint leash of claim 1, wherein said housing comprises a handle for gripping and holding said leash, a control switch and a power source.

3. The illuminated animal restraint leash of claim 2, wherein said power source comprises a plurality of batteries.

4. The illuminated animal restraint leash of claim 1, wherein said elongated tubular lead is a rope and said rope is attached to a hook for attaching said restraint to an associated collar.

5. The illuminated animal restraint leash of claim 4, wherein said rope comprises a strap extending from said handle.

6. The illuminated animal restraint leash of claim 5, wherein said rope is formed of nylon.

7. The illuminated animal restraint leash of claim 1, wherein said elongated inner tube comprises a PVC tube.

8. The illuminated animal restraint leash of claim 1, wherein said elongated fiber optic member further comprises cladding.

9. The illuminated animal restraint leash of claim 8, wherein said cladding comprises one of Teflon or PVC material.

10. An illuminated animal restraint, comprising:
an elongated leash having a first end comprising a handle and a second end, wherein said handle comprises a light source comprising a Light Emitting Diode and a switch for selectively operating said light source;
wherein said leash comprises a light transmitting member comprising fiber optics operationally connected via a wireless connection at a light transmitting member light receiving end to said light source, wherein said light transmitting member extends through said leash along an entire continuous length of the leash from said first end to said second end thereby illuminating the entire length of the leash; and an elongated inner tube extending within the interior of the elongated leash, the elongated fiber optic member extending within an interior of the inner elongated tube and the inner elongated tube formed of transparent or translucent material.

11. The illuminated animal restraint of claim 10, wherein said leash further comprises a rope which covers said light transmitting member.

12. The illuminated animal restraint of claim 10, wherein said elongated inner tube comprises a clear or transparent PVC tube.

13. The illuminated animal restraint of claim 10, wherein said light transmitting member also illuminates at least a front portion and a rear portion of said leash.

14. A method for illuminating an entire length of an animal restraint comprising the steps of:
   providing an elongated leash having a first end comprising a handle and a second end, wherein said leash has an entire length extending from said first end to said second end;
   providing a light source comprising a Light Emitting Diode within the handle and a switch for selectively operating said light source;
   providing a light transmitting member comprising fiber optics wirelessly connected to said light source at a light receiving end of said light transmitting member, wherein said light transmitting member extends through said leash along an entire continuous length of the leash from said first end to said second end thereby illuminating the entire length of the leash; and providing an elongated inner tube extending within the interior of the elongated leash, the elongated fiber optic member extending within an interior of the inner elongated tube and the inner elongated tube formed of transparent or translucent material.

15. The illuminated animal restraint of claim 1, wherein said light source is secured to a holding member which is directly attached to said light transmitting member.

16. The illuminated animal restraint leash of claim 1, wherein the elongated fiber optic member is detached from the elongated flexible tubular lead along substantially an entire length of the elongated flexible tubular lead, thereby enabling the elongated flexible tubular lead to longitudinally extend and/or stretch relative to the elongated fiber optic member.

* * * * *